United States Patent [19]
Kitaura

[11] 3,843,249
[45] Oct. 22, 1974

[54] EXPOSURE CORRECTION FACTOR SETTING INDICATOR FOR CAMERAS

[75] Inventor: Mashio Kitaura, Osaka, Japan

[73] Assignee: Minolta Camera Kabushiki Kaisha, Osaka, Japan

[22] Filed: Dec. 28, 1973

[21] Appl. No.: 429,277

[30] Foreign Application Priority Data
Dec. 29, 1972  Japan............................... 47-1516

[52] U.S. Cl............................354/60, 354/289
[51] Int. Cl.....................G01j 1/44, G03b 17/18
[58] Field of Search........... 354/23, 53, 50, 51, 219, 354/289

[56] References Cited
UNITED STATES PATENTS

| | | | |
|---|---|---|---|
| 3,220,329 | 11/1965 | Coleman | 354/42 |
| 3,303,765 | 2/1967 | Jacob et al. | 354/58 |
| 3,703,130 | 11/1972 | Watanabe | 354/58 |
| 3,733,984 | 5/1973 | Yata | 354/51 |
| 3,792,648 | 2/1974 | Ishiguro | 95/10 C |

*Primary Examiner*—Joseph F. Peters, Jr.
*Assistant Examiner*—John Feldhaus
*Attorney, Agent, or Firm*—Staas, Halsey & Gable

[57] ABSTRACT

An exposure correction factor setting indicator for a light intensity measuring circuit and in particular, such a circuit adapted for use with a camera, is disclosed as comprising a plurality of light emitting elements, one of which is to be actuated in accordance with the intensity of the measured light, a pulse generator for producing a pulse of a period corresponding to the ON-OFF period of the light emitting elements, a switching circuit responsive to the pulses derived from the pulse generator to energize a selected one of the light emitting elements, and a changeover means operative in a first, normal mode wherein the pulses of the pulse generator are not applied to the switching circuit and in a second mode wherein the pulses are applied to the switching circuit to turn OFF and ON the selected radiation emitting element thereby to indicate that the exposure rate setting indicator is set at a value other than normal. The changeover circuit includes a variable resistive element coupled to a manually actuated member set according to the desired exposure rate. The variable resistive element is incorporated into the light measuring circuit to vary its output according to the set value of exposure rate.

6 Claims, 7 Drawing Figures

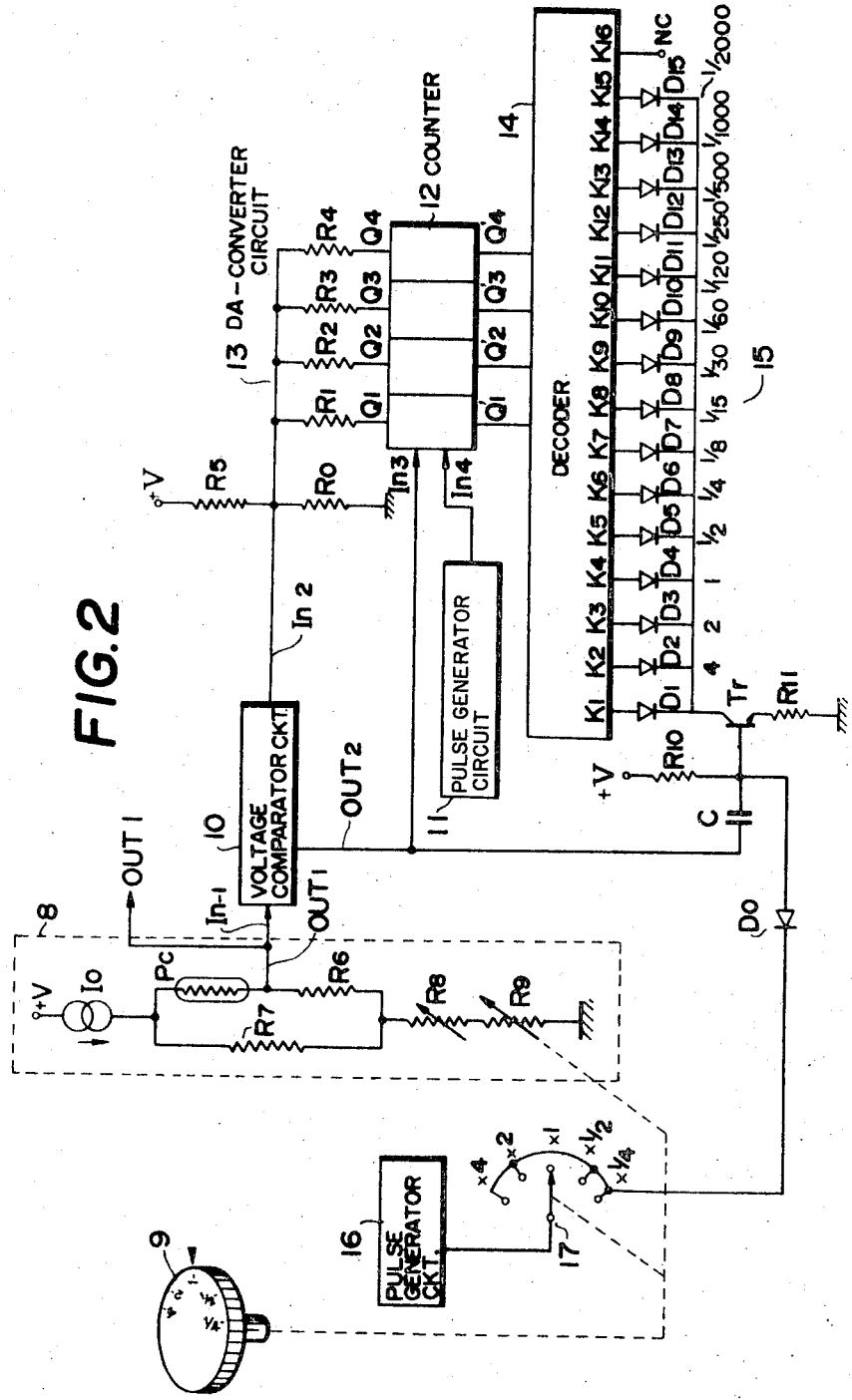

EXPOSURE CORRECTION FACTOR SETTING INDICATOR FOR CAMERAS

BACKGROUND OF THE INVENTION

1. Field of the Invention

This invention relates to an exposure correction factor setting indicator for cameras, and more particularly to a device for warning of an unusual condition of the camera, especially an exposure condition which has been shifted or varied from a proper or calibrated one.

The above indicator includes such a device to compensate for the personal desire of the operator to slightly underexposure or slightly overexposure the photographs being taken.

2. Description of the Prior Art

Generally, in photographing, there are some occasions when the exposure parameter or condition is intentionally selected to provide less or more exposure than an optimum exposure value indicated by an exposure meter. In cameras incorporating therein a light measuring device adjustable in accordance with a film sensitivity setting, in particular, cameras having an automatic exposure control device, overexposure or underexposure such as mentioned above can be obtained by setting the film sensitivity over or under that of the film used. For example, in the case of the sensitivity of the film used being ASA100, underexposure of 1EV can be obtained by setting the film sensitivity setting device at ASA200. This implies that the camera effects exposure of a film of ASA200 and this is one-half of the exposure for the film of ASA100, which implies underexposure of 1EV.

In some kinds of cameras, there is provided an exposure correction factor setting device independently of the film sensitivity setting device and this exposure correction factor setting device is designed so that, for example, overexposure of 1EV, can be achieved only by setting a dial or like member to a dial reading "x2". With the cameras equipped with such a setting device, there is the possibility that, after photographing with the exposure correction factor being set at "x2", the photographer forgets the previous setting of the exposure correction factor at "x2" in the subsequent photographing in which normal exposure should be given. To avoid this, there has been proposed cameras adapted to provide an indication of "x1", "x2", . . . in the finder in ganged relation to the exposure correction factor setting device. With such cameras, however, the photographer are often too absorbed in adjusting the focus to notice the indication.

SUMMARY OF THE INVENTION

The primary object of this invention is to provide an exposure correction factor setting indicator for cameras which are designed so that in the case of underexposure or overexposure photographing, a luminous indication by an indicator unit for the digital indication of the exposure in the finder periodically turned on and off, thereby to effectively informing the photograher of the unusual photographing condition of the camera.

In accordance with this and other objects, this invention provides an exposure correction factor setting indicator for a light intensity measuring circuit and in particular, such a circuit adapted for use with a camera, comprising a plurality of light emitting elements, one of which is to be actuated in accordance with the intensity of the measured light, a pulse generator for producing a pulse of a period corresponding to the ON-OFF period of the light emitting elements, a switching circuit responsive to the pulses derived from the pulse generator for energizing a selected one of the light emitting elements, and a changeover means operative in a first, normal mode wherein the pulses of the pulse generator are not applied to the switching circuit and in a second mode wherein the pulses are applied to the switching circuit to turn off and on the selected radiation emitting element thereby to indicate that the exposure correction factor setting indicator is set at a value other than normal.

In a further aspect of this invention, the changeover circuit includes a variable resistive element coupled to a manually actuated member set according to the desired exposure correction factor. The variable resistive element is incorporated into the light measuring circuit to vary its output according to the set value of exposure correction factor.

BRIEF DESCRIPTION OF THE DRAWINGS

In the detailed description of the preferred embodiment of the invention, reference is made to the accompanying drawings, in which:

FIG. 2 is a circuit diagram showing one example of this invention;

DESCRIPTION OF THE PREFERRED EMBODIMENTS

Figure 1:
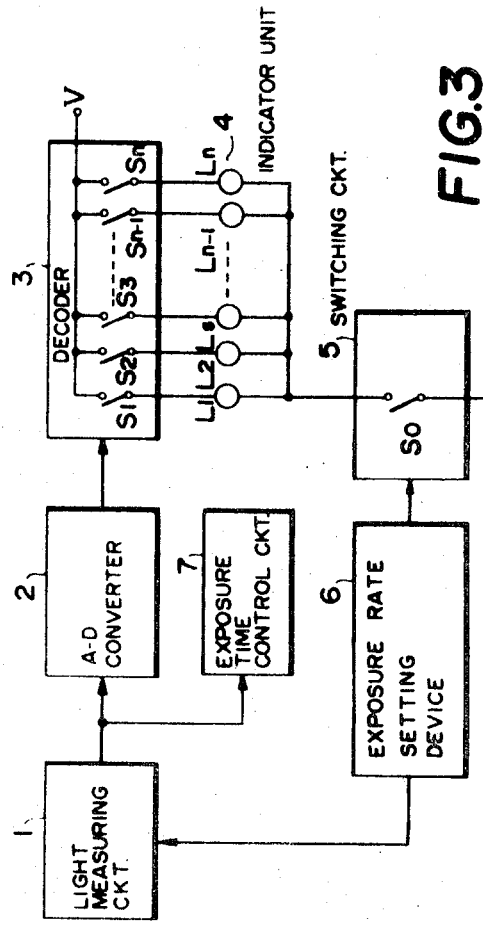
FIG. 1 is a block diagram, for explaining the principles of this invention.

In FIG. 1, there is shown in block form the principles of this invention. A description will be given first of the outline of this invention with regard to FIG. 1.

In FIG. 1, reference numeral 1 indicates a light measuring circuit, which generates a photoelectric output representative of the scene brightness taking into account other exposure parameters set on the camera such as the film sensitivity, a preset lens aperture value and the exposure correction factor setting. Reference numeral 2 designates an A-D (analog-to-digital) converter, which converts the output (an analog value) from the light measuring circuit 1 into a digital signal. Reference numeral 3 identifies a decoder, which converts the digital output from the A-D converter circuit 2 into a code signal suitable for a display. In principle, the decoder 3 can be simulated to be a circuit, as shown, which has parallel-connected switches $S_1$, $S_2$, . . . and $S_n$, any one of which is turned on in accordance with the output of the A-D converter circuit 2. Reference numeral 4 denotes an indicator unit comprised of indicating devices $L_1$ to $L_n$ such as, for example, luminescent diodes lamps or the like which are adapted to provide a digital indication of the exposure time in the finder. The indicating devices $L_1$ to $L_n$ correspond to shutter speeds, for example, 4 sec., 2 sec., 1 sec., . . . 1/1000 sec. and 1/2000 sec., respectively. Reference numeral 5 represents a switching circuit, which is controlled by an exposure correction factor setting device 6 described later and which is shown to be a switch $S_o$ equivalently. In normal photographing, the switch $S_o$ is held in its ON state but, in the case of unusual exposure, it is controlled by the exposure correction factor setting device 6 to be intermittently turned on and off. Reference numeral 7 shows an exposure time control circuit which controls the exposure time in accordance with the output voltage derived from the light measuring circuit 1. In single lens reflex cameras of the through-the-lens-type light measuring system, the control circuit 7 includes a storing circuit for storing the output voltage from the light measuring circuit 1.

During normal photographing, the switch $S_o$ of the switching circuit 5 is held in its on state and the output derived from the light measuring circuit 1 provides a proper exposure time in response to the scene brightness. The exposure time is indicated in a digital form by the indicator unit 4, that is, a selected one of the indicating devices $L_1$ to $L_n$ is actuated.

For example, where the output from the light measuring circuit 1 is converted by the A-D converter circuit 2 to thereby turn on the switch $S_3$ of the decoder 3, the indicating device $L_3$ is lighted to indicate that the exposure time is 1 sec.

In the case of photographing with unusual exposure, the switch $S_o$ of the switching circuit 5 is intermittently actuated by the exposure correction factor setting device 6 and, at the same time, the level of the output voltage from the light measuring circuit 1 is altered. For example, where the exposure time is set to be longer by 1EV than that (1 sec.) in the above case, the output level of the light measuring circuit 1 varies correspondingly to 1EV, so that the indicating device $L_2$ is lighted but the lighting of the indicating device $L_2$ is made intermittent by the actuation of the switch $S_o$. Accordingly, the photographer can easily recognize from such intermittent lighting of the indicating device $L_2$ that the camera is in the unusual exposure condition. In the subsequent photographing, even if the photographer forgets the previous unusual exposure setting, he will immediately notice it from the intermittent display.

FIG. 2 is a circuit diagram illustrating one example of this invention. Reference numeral 8 designates a light measuring circuit (corresponding to circuit 1 in FIG. 1). Reference characters $R_6$ and $R_7$ indicate resistors: Pc represents a light receiving element which receives light from an object to be photographed and varies its resistance value in accordance with the object brightness; $R_8$ identifies a variable resistor whose resistance value is changed in response to the film sensitivity or a preset aperture value; $R_9$ indicates a variable resistor whose resistance value is changed in ganged relation to an exposure rate setting dial 9; $I_o$ designates a constant current source; and Out1 designates an output terminal. A photoelectric signal representative of the light from the object received by the light receiving element Pc is indicated at the output terminal Out1 in the form of a voltage proportional to the logarithm of the object brightness. Namely, the circuit composed of the resistors $R_6$ and $R_7$ and the light receiving element Pc generates a voltage proportional to the logarithm of the object brightness and this voltage appears across the resistor $R_6$. The variable resistors $R_8$ and $R_9$ are supplied with a constant current from the constant current source $I_o$, and the potential at the connection point of the resistors $R_6$ and $R_8$ is proportional to the resistance value of the variable resistors $R_8$ and $R_9$. Accordingly, the output voltage between the output terminal Out1 and the ground is indicative of the sum of the voltage across the resistor $R_6$ proportional to the logarithm of the scene brightness of the the voltages across the variable resistors $R_8$ and $R_9$. The variable resistors $R_8$ and $R_9$ have linear characteristics and the voltages thereacross are varied by a certain value in response to a change in the film sensitivity or a preset aperture value or a change in the exposure correction factor set value corresponding to 1Ev. The above-mentioned certain value is selected to be equal to a change in the voltage across the resistor $R_6$ which is caused when the scene brightness varies by 1EV. This will become more apparent from FIG. 3.

Figure 3:
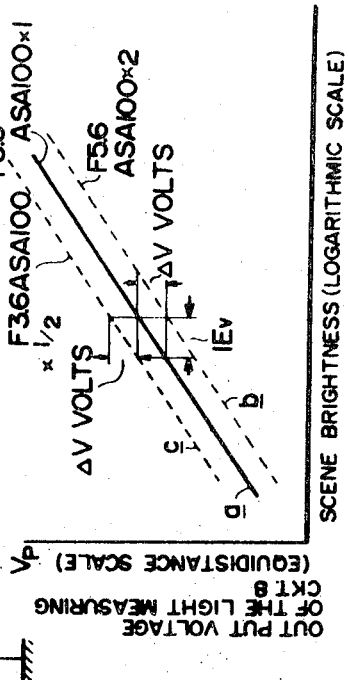
FIG. 3 is a graph showing the relationship between the output voltage from a light measuring circuit and the scene brightness in the example of FIG. 2.

FIG. 3 shows the relationships between the output voltage at the output terminal Out1 and the scene brightness, the film sensitivity, the preset aperture value and the exposure correction factor set value. In FIG. 3, the ordinate represents the output voltage $V_p$ at the output terminal Out1 of the light measuring circuit 8 on an equidistance scale and the abscissa represents the scene brightness on a logarithmic scale. The straight line $a$ indicates the relationship between the scene brightness and the output voltage $V_p$ in the case of normal exposure, where for example, the sensitivity of a film used is ASA100 and the preset aperture value is F56. The straight lines $b$ and $c$ show the relationships between the scene brightness and the output voltage $V_p$ in the case where the exposure correction factors are set for obtaining exposure values which are larger or smaller by 1EV than the normal exposure value, respectively. In the case of the exposure value being larger by 1EV than the normal exposure value, the output voltage $V_p$ is shifted down in parallel by $\Delta V$ volts as compared with that in the case of the normal exposure. In the case of the exposure value smaller by 1EV, the output voltage $V_p$ is shifted up in parallel by $\Delta V$ volts. The straight line $b$ corresponds to setting of the preset aperture value of the line $a$ at F4, and to a setting of the film sensitivity at ASA50. Consequently, it is also possible to arrange that the variable resistor $R_8$ performs the function of that $R_9$, too.

The light measuring circuit 8 such as described above and disclosed in the U.S. Pat. Nos. 3,728,946, 3,733,984 and 3,756,130, each assigned to the assignee of the present invention, has been already proposed for use in an automatic exposure control circuit of single lens reflex cameras of the through-the-lens-type light measuring system. In this type of cameras, during exposure, the mirror is sprung up to intercept the light to be measured, so that the light measuring voltage corresponding to the scene brightness before the mirror is sprung up is charged and stored in a capacitor and the exposure time is automatically controlled in accordance with the stored voltage. The output terminal Out1 of the light measuring circuit 8 has connected thereto a storing capacitor (not shown) and an input terminal In2 of a voltage comparator circuit 10 described later. In general, a voltage proportional to the logarithm of the scene brithness is generated by the light measuring circuit 8 and stored in the capacitor so that even if the power source voltage is low, the scene brightness may cover a wide range.

Referring back to FIG. 2, reference numeral 9 indicates the aforementioned exposure correction factor setting dial. Exposure correction factors $x4$. $x2$. . . . are indicated for example, on a dial plate as shown, and by turning the dial 9 to set the dial reading to an index, a desired exposure correction factor is set.

Reference numeral 10 indicates the aforesaid voltage comparator circuit comprised of a differential amplifier switching circuit. Where the voltage level at its input terminal In2 is higher than that at the input terminal In1, the voltage level at its output terminal Out2 is low and where the voltage levels at the input terminals In2 and In1 are opposite to the above ones, the voltage level at the output terminal Out2 is high.

Reference numeral 11 designates a clock pulse generator circuit, which applies a pulse to an input terminal In4 of a reversible binary counter 12 of the subsequent stage. The reversible binary counter 12 effects additive counting of the pulses fed into the input terminal In4 when supplied at its input terminal In3 with the voltage of high level (hereinafter identified as "1") and effects subtractive counting of the pulses fed to the input terminal In4 when supplied at the input terminal In3 with the voltage of low level (hereinafter identified as "O"). Reference characters $Q_1$ to $Q_4$ and $Q_1'$ to $Q_4'$ identify output terminals of the reversible binary counter 12. The output terminals $Q_1$ and $Q_1'$, $Q_2$ and $Q_2'$, . . . correspond to each other and it is possible to consider that the same output is applied to each one of the pairs. These output terminals derive therefrom sixteen counted outputs.

Reference numeral 13 denotes a D-A converter circuit composed of resistors $R_0$ to $R_5$, by which the sixteen digital outputs applied thereto from the counter 12 are converted into sixteen analog voltages, which are supplied to the input terminal In2 of the voltage comparator circuit 10.

Reference numeral 14 designates a decoder (corresponding to that depicted in FIG. 1) by which the output digitalized by the counter 12 into binary numbers are converted into outputs for energizing a selected one of the diodes $D_1$ to $D_{15}$. Output terminals $K_1$ to $K_{15}$ of the decoder 14 have connected thereto luminescent diodes $D_1$ to $D_{15}$ (corresponding to the indicating members $L_1$ to $L_n$ shown in FIG. 1) of an indicator circuit 15. In response to the counted content of the counter 12, any one of the output terminals $K_1$ to $K_{16}$ is put in the state of "1" and the others remain in the state of "0". Where the outputs from the counter 12 are all in the state of "0", the output terminal $K_1$ is in the state of "1" and, at each additive counting of one pulse by the counter 12, the output terminals $K_1$ to $K_{16}$ are sequentially put in the state of "1". It is not necessary to connect a luminescent diode to the output terminal $K_{16}$.

Reference numeral 15 identifies the indicator circuit comprised of the aforesaid luminescent diodes $D_1$ to $D_{15}$, a transistor Tr, resistors $R_{10}$ and $R_{11}$ and a capacitor C. The luminescent diodes $D_1$ to $D_5$ correspond to the indicated shutter times, respectively. For example, the luminescent diode $D_1$ corresponds to 8 sec., D corresponds to 4 sec., . . . and $D_{15}$ corresponds to 1/2000 sec., as shown in FIG. 2. (Strictly speaking, $D_{15}$ corresponds to ½inch=1/2048 sec.) The indicator circuit 15 is coupled with the voltage comparator circuit 10 through the capacitor C in terms of AC. When the potential at the output terminal Out2 of the voltage comparator circuit 10 changes from "1" to "0", the transistor Tr is made nonconductive for a period of time dependent upon the time constant determined by the capacitor C and the resistor $R_{10}$. In terms of DC, the resistor $R_{10}$ provides a supply of a base current necessary for rendering the transistor Tr conductive. Further, the resistor $R_{11}$ adjusts the emitter current of the transistor Tr. The luminescent diodes $D_1$ to $D_{15}$ are described above as corresponding to the shutter times respectively, but need not always be so and may be arranged to indicate, for example, time slots of the shutter times respectively. Namely, the luminescent diode $D_1$ is adapted to correspond to a shutter time slot of 8 to 4 sec., the luminescent diode $D_2$ is adapted to correspond to a shutter time slot of 4 to 2 sec., . . . . In the present example, the shutter times can be easily indicated in the form of time slots at intervals of 2EV, 3EV and so on by changing the number of stages of the counter 12 and the circuit of the decoder 14.

Reference character 16 indicates a pulse generator circuit, which produces a signal pulse for intermittent lighting of the luminescent diodes $D_1$ to $D_{15}$ of the indicator circuit 15 through the transistor Tr (corresponding to the switch $S_o$ in FIG. 1) and the cycle of the signal pulse is equal to that of the intermittent lighting.

Reference numeral 17 identifies a change-over switch which is changed over in ganged relation to the dial 9, and which applies the pulses from the pulse generator circuit 16 to the indicator circuit 15 through a diode $D_o$ when the exposure correction factor is set at values other than $x1$ (proper exposure).

The operation of the example of FIG. 2, constructed as described above, hereinbelow be described.

A description will be given first of the operation for indicating the shutter time by the luminescent diodes $D_1$ to $D_{15}$. To facilitate a better understanding of the operation, the clock pulse generator circuit 11, the counter 12 and the D-A converter circuit 13 will be described first.

Figure 4:
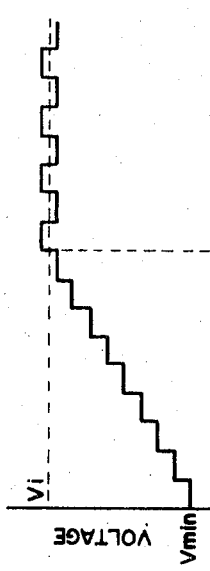
FIG. 4 is a graph showing the variation in the potential at an input terminal In2 in the case of additive counting in the example of FIG. 2.

In FIG. 4, there is shown how the output from the D-A converter circuit 13 varies in the case where counting of the pulses starts with the potentials at the output terminals $Q_1$ to $Q_4$ being all "0" and on the assumption that the potential at the input terminal In3 of the counter 12 is fixed at "1". In FIG. 4, the abscissa represents time and the ordinate refers to the output level of the D-A converter circuit 13. The circuit construction for generating a step form wave voltage, which is formed with the clock pulse generator circuit 11, the counter 12 and the D-A converter circuit 13, is a known one and the values of the resistors $R_1$ to $R_4$ of the D-A converter circuit 13 are selected to bear the following relation:

$$R_1 = 2R_2 = 4R_3 = 8R_4$$

Figure 5:
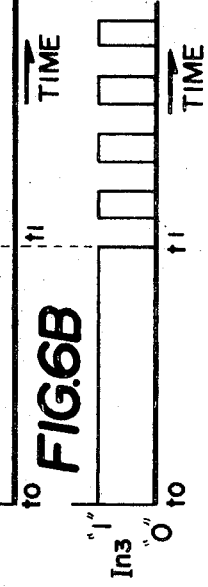
FIG. 5 is a graph, similar to FIG. 4, showing the variation in the potential at the input terminal In2 in the case of sub ractive counting in the example of FIG. 2.

The value of each step is determined by appropriately selecting the value of the resistor $R_5$ and a minimum level Vmin is determined by the resistor $R_o$. As seen in FIG. 4, the output level of the D-A converter circuit 13 rises in a stairstep manner at each counting of the pulse and, in this case, the counter 12 effects additive counting. FIG. 5 shows the manner in which the output from the D-A converter circuit 13 varies where the counting of the pulses is started when the potentials at the output terminals $Q_1$ to $Q_4$ are all "1" and on the assumption that the potential at the input terminal In3 of the counter 12 is fixed in the state of "0". In this case, the output level lowers in a stairstep manner at each counting of the pulse and the counter 12 achieves subtractive counting.

The following will describe the operations of the decoder 14 and the indicator circuit 15 in the above condition where the potential at the input terminal In3 of the counter 12 is disposed in the state of "1". Since the transistor Tr is supplied with its base current from the power source +V through the resistor $R_{10}$, it is conductive. Accordingly, where the potential at the output terminals $Q_1'$ to $Q_4'$ of the counter 12 are in the state of "0", the luminescent diode $D_1$ is lighted and, thereafter, each time the pulse is applied to the counter 12, lighting is shifted to $D_2$, $D_3$, . . . one after another. In the case where the counting of the pulse is started when the potentials at the output terminals $Q_1'$ to $Q_4'$ are all in the state of "1" with the potential at the input terminal In3 of the counter 12 being fixed in the state of "0", lighting of the luminescent diodes $D_1$, $D_2$, . . . is shifted in a direction reverse to that described above.

Figure 6A:
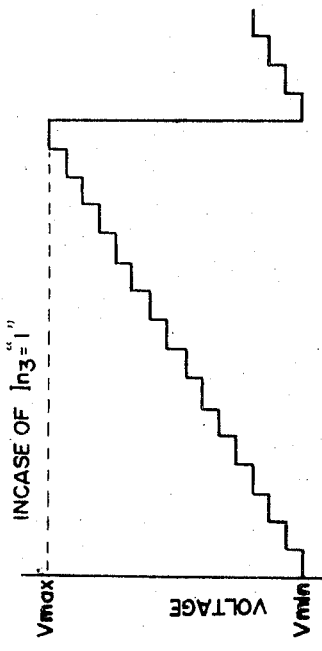
FIG. 6A is a graph showing the level at the input terminal In2 when the level at an input terminal In1 is Vi in the example of FIG. 2
Figure 6B:
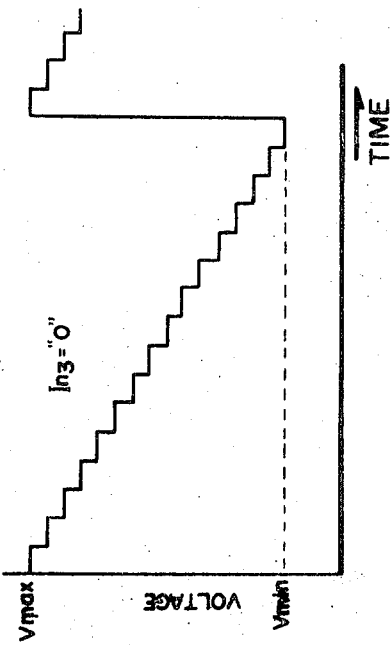
FIG. 6B shows the level at an input terminal In3 of a counter 12 at that time.

Referring now to FIG. 6, a description will be made of the operations of the light measuring circuit 8 and the voltage comparator circuit 10 in addition to the operations described above. At the instant $t_0$ when the output voltage from the light measuring circuit 8 is Vi, the potential at the input terminal In3 of the counter 12 is in the state of "1" (when the level at the input terminal In1 of the voltage comparator circuit 10 is higher than that at the input terminal In2, the level at the output terminal 2 is high, i.e., in the state of "1"). At this instant, the pulse is additively counted and the output from the D-A converter circuit 13 increases. At the instant $t_1$, the level at the input terminal In2 of the voltage comparator circuit 10 exceeds the input level at the input terminal In1 and the output at the output terminal Out2 changes to "0". Then, the next pulse is substractively counted and the level at the input terminal In1 of the voltage comparator circuit 10 lowers by one step but, in such a case, the level at the output terminal Out2 of the voltage comparator circuit 10 becomes "1". Thereafter, if the level of the output voltage Vi from the light measuring circuit 8 is constant, the level at the input terminal In2 goes above and below the level of the output voltage Vi at every impression of the pulse.

In this case, two of the luminescent diodes, for example, $D_9$ and $D_{10}$, are alternately lighted but when the potential at the output terminal Out2 of the voltage comparator circuit 10 is altered from "1" to "0", the base of the transistor Tr is reverse biased through the capacitor C. By an appropriate selection of the time constant determined by the capacitor C and the resistor $R_{10}$ (of course, the resistor $R_{10}$ serves to define the magnitude of the base current of the transistor Tr, so that the selection of the resistor $R_{10}$ is limited in this sense), the transistor Tr is made nonconductive for substantially one period of the pulse and no current flows in the luminescent diode $D_{10}$, so that only the luminescent diode $D_9$ is lighted, thereby indicating the shutter time of one-thirtieth sec. In this case, the luminescent diode $D_9$ is intermittently lighted, but if the period of the clock pulse applied to the counter 12 is selected short, the luminescent diode $D_9$ appears to human eyes as if lighted continuously.

Where the output Vi from the light measuring circuit 8 is intermediate between Vmin and Vmax, either one of the two luminescent diodes is lighted to indicate the shutter time.

Further, operation including the exposure correction factor setting device will be described.

Where the exposure correction factor setting dial 9 is set at the correction factor $x1$, the switch 17 ganged with the dial 9 selects a contact of "$x1$", in which case, one of the luminescent diodes is continuously lighted to indicate normal photographing condition as described above, Assuming that the dial 9 is set at the exposure correction factor "$x2$", the switch 17 and the variable resistor $R_9$ are each set at a position corresponding to "$x2$" in ganged relation to the dial 9 and the output voltage Vi from the light measuring circuit 8 lowers by one step from the level of "$x1$" whereby if the diode $D_9$ is lighted in the case of "$x1$", the luminescent diode $D_8$ is lighted. Then, the base of the transistor Tr is supplied with the pulses of the pulse generator circuit 16 through the diode $D_o$, by which the transistor Tr is intermittently switched on and off, thus intermittently turning on and off the luminescent diode $D_8$. Namely, when the level of the pulse is in the state of "0", the base of the transistor Tr is substantially equi-potential to the ground to render the transistor Tr nonconductive, and when the level of the pulse is in the state of "1", a reverse voltage is voltage is applied across the transistor Tr, by which the transistor Tr is biased in a forward direction through the resistor $R_{10}$ and made conductive.

It is a matter of course that the period of the pulse of the pulse generator circuit 16 is selected to be considerably longer (about 1 sec., for example,) than that of the pulse from the pulse generator circuit 11.

Where the exposure correction factor is set at other values than "$x1$" as described above, the exposure time in such a case is indicated in a digital form and the indicating member therefor is turned on and off. Although the foregoing example has been described in connection with the digital indication of the exposure time of a camera of the aperture preference system, this invention is not limited specifically thereto and easily applicable to a camera of, for example, the shutter preference system.

It will be apparent that many modifications and variations may be effected without departing from the scope of the novel concepts of this invention.

What is claimed is:

1. An exposure correction factor setting indicator for cameras of the type having a digital exposure value indicator unit for indicating the exposure value in a digital form by means of light emitting elements, in which at least one light emitting element is selectively lighted to indicate a corresponding error correction factor and when the exposure correction factor is set at a value other than a normal value, said at least light emitting element corresponding to that value is intermittently turned on and off to indicate an unusual exposure correction factor setting, said indicator comprising:

a. a pulse generator circuit for producing a pulse of a period corresponding to the ON-OFF period of the light emitting elements;

b. a switching circuit connected between the light emitting elements and a power source, and controlled by the pulse derived from said pulse generator circuit; and c. changeover means ganged with an exposure correction factor setting member for disposing said switching circuit in a condition to be switched on and off in accordance with the pulses derived from said pulse generator circuit when the exposure rate of the exposure rate setting member is set at a value other than normal.

2. An exposure correction factor setting indicator according to claim 1, wherein said switching circuit is disposed in its ON state when the exposure correction factor is set at a normal value.

3. An exposure correction factor setting indicator according to claim 1, wherein said switching circuit includes at least one transistor.

4. An exposure correction factor setting indicator according to claim 1, wherein said exposure correction factor setting member is included in a light measuring circuit of the camera and comprises a variable resistor for adjusting the value of the output of the light measuring circuit.

5. An exposure correction factor setting indicator adapted for use with a light measuring circuit, said indicator comprising:

a. a display comprising a plurality of light emitting elements;

b. a pulse generator circuit for producing a pulse having a period corresponding to the ON-OFF period of the light emitting elements;

c. switch means connected for energizing said display intermittently under the control of the pulses derived from said pulse generator circuit; and d. changeover means operative in a first mode for disconnecting said pulse generator circuit from said switch means whereby the output of the light measuring circuit energizes steadily one of said light emitting elements in accordance with the intensity of the measured light, and in a second mode wherein the pulses of said pulse generator circuit are applied to said switching circuit to intermittently energize one of said light emitting elements indicating that the exposure correction factor is set at a value other than normal.

6. An exposure correction factor setting indicator as claimed in claim 5, wherein said changeover means comprises a member manually set according to the desired exposure correction factor, and a variable impedance element coupled thereto and inserted within the light measuring circuit to adjust the output of the light measuring circuit in accordance with the setting of said setting member.

* * * * *

UNITED STATES PATENT OFFICE
CERTIFICATE OF CORRECTION

Patent No. 3,843,249  Dated October 22, 1974

Inventor(s) Mashio KITAURA

It is certified that error appears in the above-identified patent and that said Letters Patent are hereby corrected as shown below:

Column 9, line 9, change "rate" to -- correction factor --.

Signed and sealed this 31st day of December 1974.

(SEAL)
Attest:

McCOY M. GIBSON JR.  C. MARSHALL DANN
Attesting Officer  Commissioner of Patents